Sept. 3, 1963 A. G. TROKA ETAL 3,102,375
SPREADER ATTACHMENT FOR A LAWN MOWER
Filed Oct. 11, 1960 3 Sheets-Sheet 1
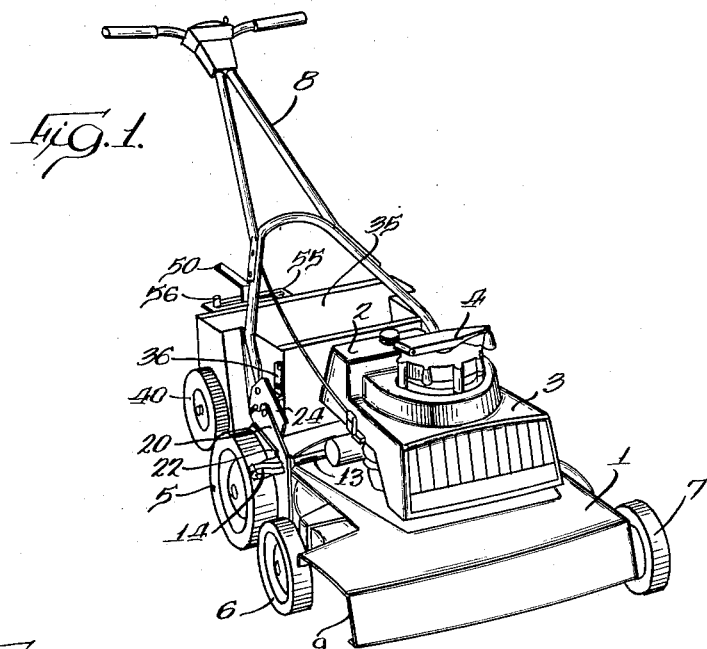
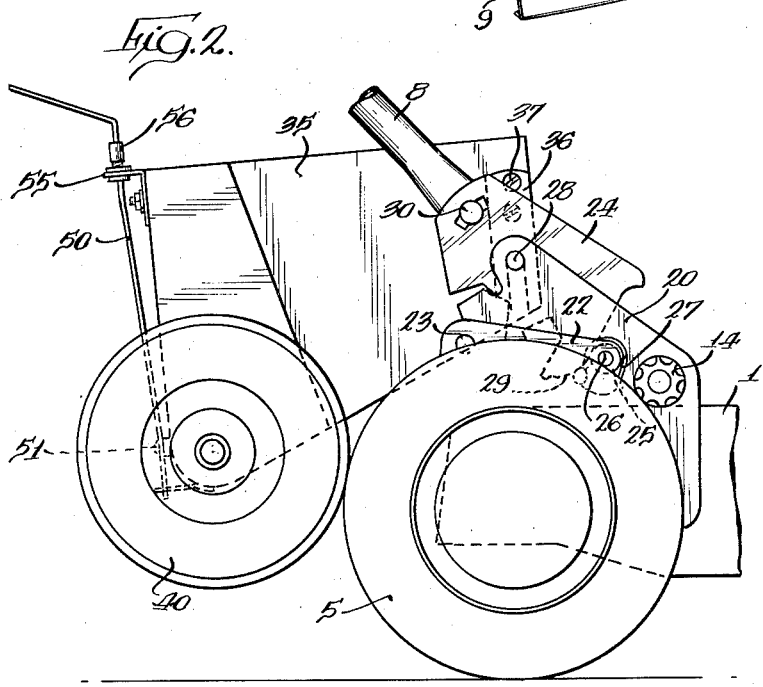
INVENTORS:
Albin G. Troka
Charles A. Mattson
Frederick O. Ottosen
By George R. Clark, Atty Sept. 3, 1963 A. G. TROKA ETAL 3,102,375
SPREADER ATTACHMENT FOR A LAWN MOWER
Filed Oct. 11, 1960 3 Sheets-Sheet 2
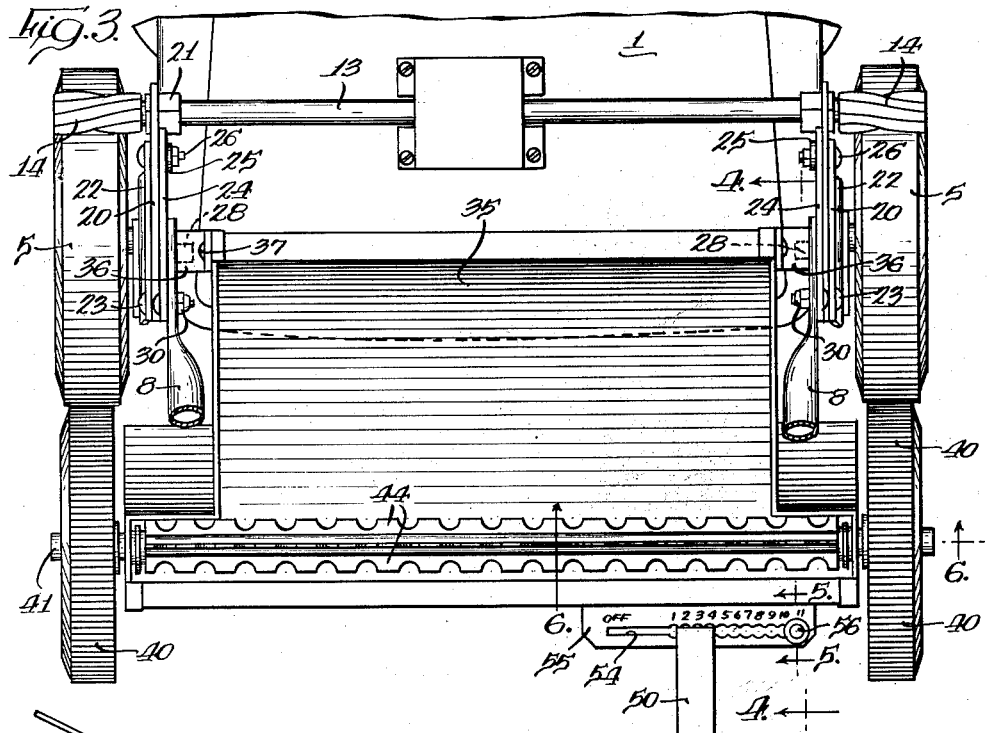
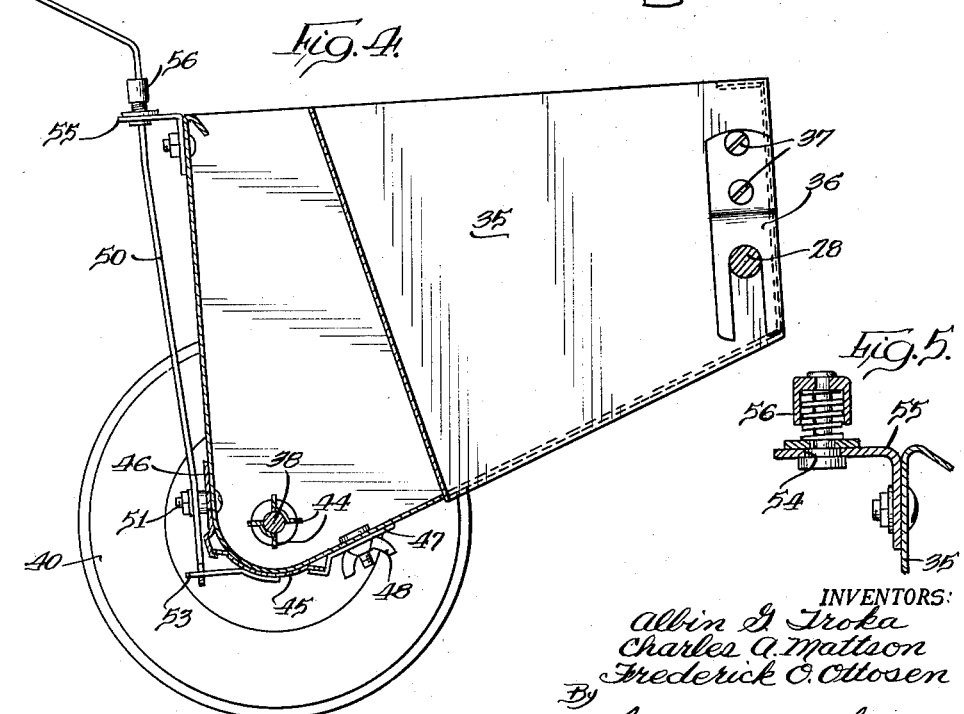
INVENTORS:
Albin G. Troka
Charles A. Mattson
Frederick O. Ottosen
By George F. Clark
Atty

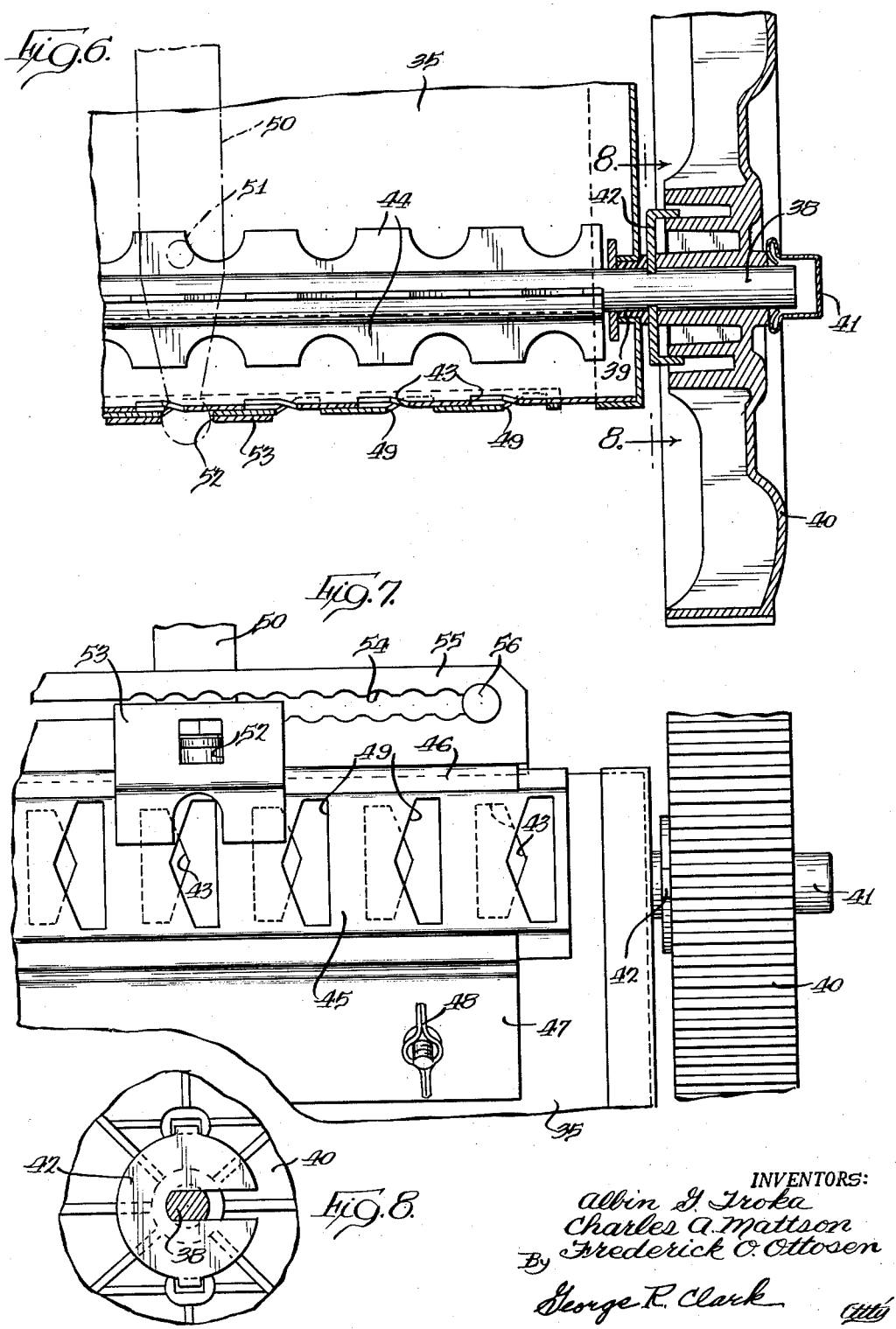

United States Patent Office 3,102,375
Patented Sept. 3, 1963

3,102,375
SPREADER ATTACHMENT FOR A LAWN MOWER
Albin G. Troka, Des Plaines, Charles A. Mattson, Oak Park, and Fredrick O. Ottosen, Chicago, Ill., assignors to Sunbeam Corporation, Chicago, Ill., a corporation of Illinois
Filed Oct. 11, 1960, Ser. No. 62,047
2 Claims. (Cl. 56—255)

This invention relates to an improvement in lawn mowers, and more particularly, to an improved ground treating material spreader attachment for lawn mowers to provide an improved combined lawn mower and ground treating material spreader assembly.

Spreader attachments for lawn mowers are well known but prior art forms thereof have not been widely used because of their several disadvantages. One of these disadvantages is that the spreader may be attached to the mower so that the user cannot mow a lawn and use the spreader simultaneously. This is typical of the spreader attachment which is used with an inverted reel type mower. In this form of spreader attachment the assembly is unstable inasmuch as the mower is in inverted position. This may result in accidental dumping of the contents of the spreader hopper. This instability is also true of some prior art spreader attachments for rotary type lawn mowers which have their spreader hoppers improperly located.

A further disadvantage of prior art spreader attachments is that they have been located ahead of the mower cutter. That is, the ground treating material is deposited on the ground immediately ahead of the reel or rotary type cutter. This arrangement is unsatisfactory since then it is difficult to control the spreading pattern and density. For instance, the high speed reel or rotary type cutter may whip the treating material about in an uncontrollable manner.

Further shortcomings of prior art spreader attachments have been that they are high in cost and complicated. For instance, they may require a major change in or addition to the mower, and they may also be time consuming or bothersome to install and require installation tools. In some instances, the number of parts for installation have been numerous, and the parts have been loose parts. Loose parts can fall to the ground or be lost or accidentally displaced.

Other prior art spreader attachments have had poor drive connections. For instance, some spreaders which have their hopper agitators operated by friction rollers have an improper place of contact between the rollers and the periphery of the ground wheels. Therefore, the drive connection has been inefficient or unsatisfactory in the absence of special means to hold the friction rollers and ground wheels engaged.

Accordingly, it is an object of this invention to provide an improved lawn mower spreader attachment and an improved combined lawn mower and ground treating material spreader assembly which will overcome the disadvantages of the prior art.

It is a further object of this invention to provide an improved lawn mower spreader attachment which can be operated simultaneously with the mower.

It is a still further object of this invention to provide an improved spreader attachment for a mower which will not make the mower unstable or easy to tip over.

An additional object of the invention is to provide a spreader attachment for a mower in which the density and pattern of the ground treating material can be controlled and is not defeated by the action of the mower cutter.

A further object of the invention is to provide a spreader attachment which will have no loose parts which may be accidentally lost or misplaced.

A still further object of the invention is to provide a low cost and uncomplicated spreader attachment for a mower which requires no change in or addition to the mower, and which has a minimum number of parts.

Yet another object of the invention is to provide a mower spreader attachment which can be very quickly installed or removed with a minimum of effort and time and without any tools.

Still a further object of the invention is to provide a combined lawn mower and spreader attachment which has an efficient drive connection between the mower ground wheels and the friction rollers for driving the hopper agitator.

In one form of the invention the spreader is positioned behind the mower cutter with the mower in its normal operating position. This permits simultaneous operation of the mower and spreader and control of the spreading pattern and density. The spreader hopper is pivotally mounted on the mower and so positioned on the mower that the hopper agitator rollers make efficient frictional driving engagement with the mower ground wheels solely due to the weight of the spreader and its contents but without making the assembly unstable or prone to accidental tipping over. The pivotal connection between the spreader hopper and mower is a simple two-piece hook and pin type one, which is quick to operate, has no loose parts, and requires no tools. Furthermore, the location of the spreader hopper on the mower and its pivotal connection thereto requires no change in or addition to the mower, and this is accomplished without interfering with operation of the mower handle in those power mowers which use the handle as a means for controlling the drive and no-drive condition of the mower.

The features of the invention which are believed to be novel are set forth with particularity in the appended claims. The invention itself, however, both as to its organization and operation, together with further objects and advantages thereof, may best be understood by reference to the following description taken in connection with the accompanying drawings.

In the drawings FIG. 1 is a perspective view of one form of the invention;

FIG. 2 is a fragmentary broken away enlarged left hand side view of the device shown in FIG. 1;

FIG. 3 is a fragmentary broken away enlarged top view of the device;

FIG. 4 is an enlarged sectional view taken along line 4—4 of FIG. 3;

FIG. 5 is an enlarged sectional view taken along the line 5—5 of FIG. 3;

FIG. 6 is an enlarged sectional view taken along the line 6—6 of FIG. 3;

FIG. 7 is a fragmentary broken away enlarged bottom view of the device; and

FIG. 8 is a sectional view taken along the line 8—8 of FIG. 6.

Referring now to FIG. 1 of the drawings, illustrated therein is one form of the invention as applied to a rotary type power lawn mower. This is a conventional form of mower which is currently available on the market, and its details are described in copending E. G. Lill patent application Serial No. 835,464 filed August 24, 1959, now Patent No. 3,035,385, and assigned to the same assignee as the instant invention.

The mower comprises a frame or support 1 which is commonly called the deck of the mower. The mower has a gasoline engine type power plant which comprises conventional parts such as a gas tank 2, and engine housing 3, and a hand crank 4 for starting the engine. The power plant is positioned on the deck 1. A not shown rotary type mower cutter blade which is driven by the power plant is positioned beneath the deck 1.

The deck 1 is supported off the ground on a plurality of ground wheels. In the form of mower shown there are two aligned rear wheels 5, and staggered front wheels 6 and 7. The mower is guided along the ground by a rearwardly extending handle 8. The grass clippings are laterally expelled by the not shown cutter blade from beneath the deck 1 through a chute opening 9.

The mower is driven along the ground by rear wheels 5. These wheels are driven by a horizontally disposed jackshaft 13 which in turn is driven by the power plant. The ends of the jack shaft have wheel engaging friction rollers 14 thereon which are engaged with the periphery of wheels 5 to propel the mower. In the illustrated form of the invention the axis of jack shaft 13 is stationary and the axis of the wheels 5 is moved to place wheels 5 in and out of engagement with rollers 14. However, the arrangement could be the opposite.

The wheels 5 are moved into and out of engagement with rollers 14 by control means positioned adjacent each of the rear wheels which control means is operated by the handle 8. The up position of the handle is the drive position, and the down position of the handle is the no-drive position.

Referring now also to FIGS. 2 and 3, the control means comprises a pair of jack shaft support brackets 20 which are fastened to the deck 1 by suitable means. Brackets 20 rotatably support the opposite ends of the jack shaft 13 in suitable bearings 21. The friction rollers 14 are disposed outside the brackets 20.

The wheels 5 are rotatably journalled in a pair of wheel bearing plates 22. Plates 22 are positioned along the outer sides of brackets 20 and they can be connected together by a not shown cross-strut or the like to insure simultaneous movement of wheels 5 toward and away from rollers 14. Plates 22 are pivotally mounted on the brackets 20 by pins or bolts 23 or the like.

When plates 22 are pivoted about pins 23 the wheels 5 are caused to move toward or away from the jack shaft 13. The means for causing this pivotal movement comprises a pair of handle brackets 24 which are engaged or disengaged with a pair of cam rollers 25 or the like connected to the plates 22. The rollers 25 are mounted on the plates 22 by pins or bolts 26 or the like and extend through slots 27 formed in brackets 20. Rollers 25 extend through brackets 20 since the brackets 24 are mounted on the inside of brackets 20. The brackets 24 are pivotally mounted on the brackets 20 by pivot pins or the like 28.

The lower ends of the brackets 24 have cam surfaces 29 formed thereon which cooperate with the cam rollers 25. The handle 8 is bifurcated at its lower ends and connected to the upper ends of brackets 24 by means such as bolts 30 and nuts. When the handle 8 is moved down the cam surfaces 29 engage the cam rollers 25 to cause the plates 22 to move clockwise and this results in disengagement of the wheels 5 and friction rollers 14. When the handle 8 is moved up the cam surfaces 29 are disengaged from the cam rollers 25 which frees the plates 22 for counterclockwise movement by not shown springs to engage the wheels with the friction rollers 14. This is the wheel drive position illustrated in FIG. 2.

There are other aspects of the control means which are not described herein inasmuch as they are not necessary for a full understanding of the instant invention. For instance, the handle has an extreme up or vertical storage position and stop means are provided for each of the handle positions. These other aspects of the control means are fully described in the referred to copending Lill patent application, now Patent No. 3,035,385.

The pivot pins 28 for the handle brackets are part of the drive and no-drive control means. They extend toward each other through the brackets 24 from the brackets 20. The brackets 24 do not become disassembled from the pins 28 since the brackets 24 are urged outwardly by the resiliency of the bifurcated lower end of handle 8. In the invention the protruding inner ends of the pins 28 are used as the means and place of pivotal mounting for a ground treating material spreader for the lawn mower.

Referring now also to FIGS. 4 to 8, the spreader comprises a hopper 35. The forward end of hopper 35 has a pair of bifurcated support brackets or hooks 36 connected thereto by means such as bolts 37. These support brackets 36 are hooked on the pins 28 for pivotal mounting of the spreader at the rear of the mower. Thus, the pivotal connection is an uncomplicated two-piece hook and pin type one for quick installation or removal of the spreader. A minimum number of parts is used, there are no loose parts, and no tools are required for attaching or removing the spreader. Furthermore, one of the two-piece connections is an existing part of the mower. Therefore, no change in or addition to the mower is required by the spreader.

The hopper 35 is generally trapezoidal in lengthwise cross-section. The rear part, which is the deepest part, has an agitator or feed shaft 38 journalled in the lower part thereof by a pair of bushings 39. The outer ends of shaft 38 have friction rollers or wheels 40 connected thereto for frictionally driving the agitator or feed shaft by the ground wheels 5. The rollers 40 are retained on shaft 38 by hub caps 41, and the rollers 40 are fixed to the shaft 38 by suitable keying elements 42. The rollers 40 can have their outer peripheries grooved or serrated for good frictional contact with the wheels 5, which is also true of the jack shaft rollers 14.

The hopper is relatively short in length compared to its width. Also, the front end of the hopper 35 is positioned between the lower legs of the handle 8 and over the rear of the mower above the wheels 5. This places the center of gravity of the hopper and its load close enough to the mower so that the mower is not unstable or accidentally tipped over as when the handle 8 is pushed down for the no-drive position of the ground wheels. A firm frictional drive connection is obtained between the rollers 40 and wheels 5 since rollers 40 contact the wheels 5 at a point above a horizontal plane drawn through the axis of wheels 5, and this firm contact is maintained by the weight of the hopper 35 and its load. It will be appreciated that if the point of contact were below said plane it might be necessary to use springs to urge rollers 40 into contact with wheels 5.

The hopper has a differential width. That is to say, it is stepped along its length so that it is narrow at its forward end and wide at its rear end. This means that the hopper doesn't interfere with normal operation of handle 8 nor requires any change in or relocation of the handle. The wide rear end of hopper 35 provides wide coverage by the spreader. The treating material is spread through a plurality of bottom outlet openings 43 formed in the hopper bottom along the agitator. These openings can be effectively adjusted by manual control means to be described hereinafter. The shaft 38 has a plurality of fingers, tabs, blades or the like 44 formed thereon which agitate or sweep or feed the treating material toward the openings 43.

The manual control means for adjusting the openings 43 comprises a slotted lengthwise movable plate 45 positioned opposite to the openings 43 on the outer bottom surface of hopper 35. The plate 45 is retained in position by a pair of clamping plates 46 and 47. The plate 46 can be welded to hopper 35 whereas the plate 47 may be removably secured thereto by bolts and wing nuts 48 so that plate 45 can be removed if so desired. The openings 43 are varied depending upon the positioning of slots 49 in plate 45 with respect to the openings 43.

The plate 45 is moved lengthwise by a handle control lever 50 which is pivoted between its opposite ends on means such as bolt 51 and a nut. The lower end of the lever is rounded and is connected to the plate 45 by passing through a slot 52 formed in a connecting tab 53 which is secured to plate 45. The length of the slot 52 is equal to the diameter of the rounded lower end of lever 50 thereby eliminating lost motion between these two parts. The upper end of lever 50 operates within an indexed slot 54 of an indicator plate 55 secured to the hopper. A spring loaded selector button 56 can be used in conjunction with the indexed slot 54 to preselect the size of openings 43 before operating the lever 50.

While there has been shown and described a particular embodiment of the invention, it will be obvious to those skilled in the art that changes and modifications may be made without departing from the invention, and that it is intended by the appended claims to cover all such changes and modifications as fall within the true spirit and scope of the invention.

What is claimed as new and desired to be secured by Letters Patent of the United States is:

1. In the combination of a lawn mower having a grass cutter and a rearwardly extending handle which is connected to the mower for controlling the mower and a hopper mounted on the mower to the rear of the cutter for spreading ground treating material, said handle being bifurcated at its lower end, the improvement of said hopper being narrower at its forward portion than its rear portion, the width of said forward portion being less than the spacing between the bifurcations of the handle for positioning said forward portion between said bifurcations to locate said hopper close to the mower, said rear portion having ground treating material outlet openings formed along its width and the width of said rear portion being greater than the spacing between said bifurcations and substantially equal to the width of the mower for maximum ground coverage by the hopper, and said hopper being mounted on the mower solely by hook elements and hook receiving elements connected to said hopper and mower whereby tools are unnecessary to mount said hopper on said mower.

2. In the combination of claim 1 wherein said bifurcated handle is pivotally connected to said mower by a pair of pivot pins, the further improvement of said hook elements being connected to said hopper and said pins comprising said hook receiving elements.

References Cited in the file of this patent
UNITED STATES PATENTS

| | | |
|---|---|---|
| 2,792,970 | Gaiman | May 21, 1957 |
| 2,896,731 | Siwek | July 28, 1959 |